United States Patent [19]
Zebuhr

[11] 4,144,874
[45] Mar. 20, 1979

[54] SOLAR PANEL

[75] Inventor: William H. Zebuhr, Nashua, N.H.

[73] Assignee: Sunhouse, Incorporated, Nashua, N.H.

[21] Appl. No.: 805,562

[22] Filed: Jun. 10, 1977

[51] Int. Cl.² .................................. F24J 3/02
[52] U.S. Cl. ..................................... 126/271; 237/1 A
[58] Field of Search ................ 126/270, 271; 237/1 A

[56] References Cited

U.S. PATENT DOCUMENTS

| 3,239,000 | 3/1966 | Meagher | 126/271 |
|---|---|---|---|
| 3,893,506 | 7/1975 | Laing | 126/271 |
| 3,918,430 | 11/1975 | Stout et al. | 126/271 |
| 4,060,070 | 11/1977 | Harter | 126/271 |

FOREIGN PATENT DOCUMENTS 2510321  9/1976  Fed. Rep. of Germany .......... 126/271

*Primary Examiner*—Kenneth W. Sprague
*Attorney, Agent, or Firm*—Donald P. Gillette

[57] ABSTRACT

An extruded solar panel formed as a unit and including a plurality of co-planar fluid passageways joined side by side and having at least one radiation transmissive cover extending over the passageways. The edges of the cover are joined to the edges of the group of passageways to form a dead-air space over the passageways. The opposite longitudinal edges of the cover and passageway structure have flanges that can be interlocked for ease of assembly, and one or more ribs are provided to support the passageways from the roof structure.

13 Claims, 6 Drawing Figures

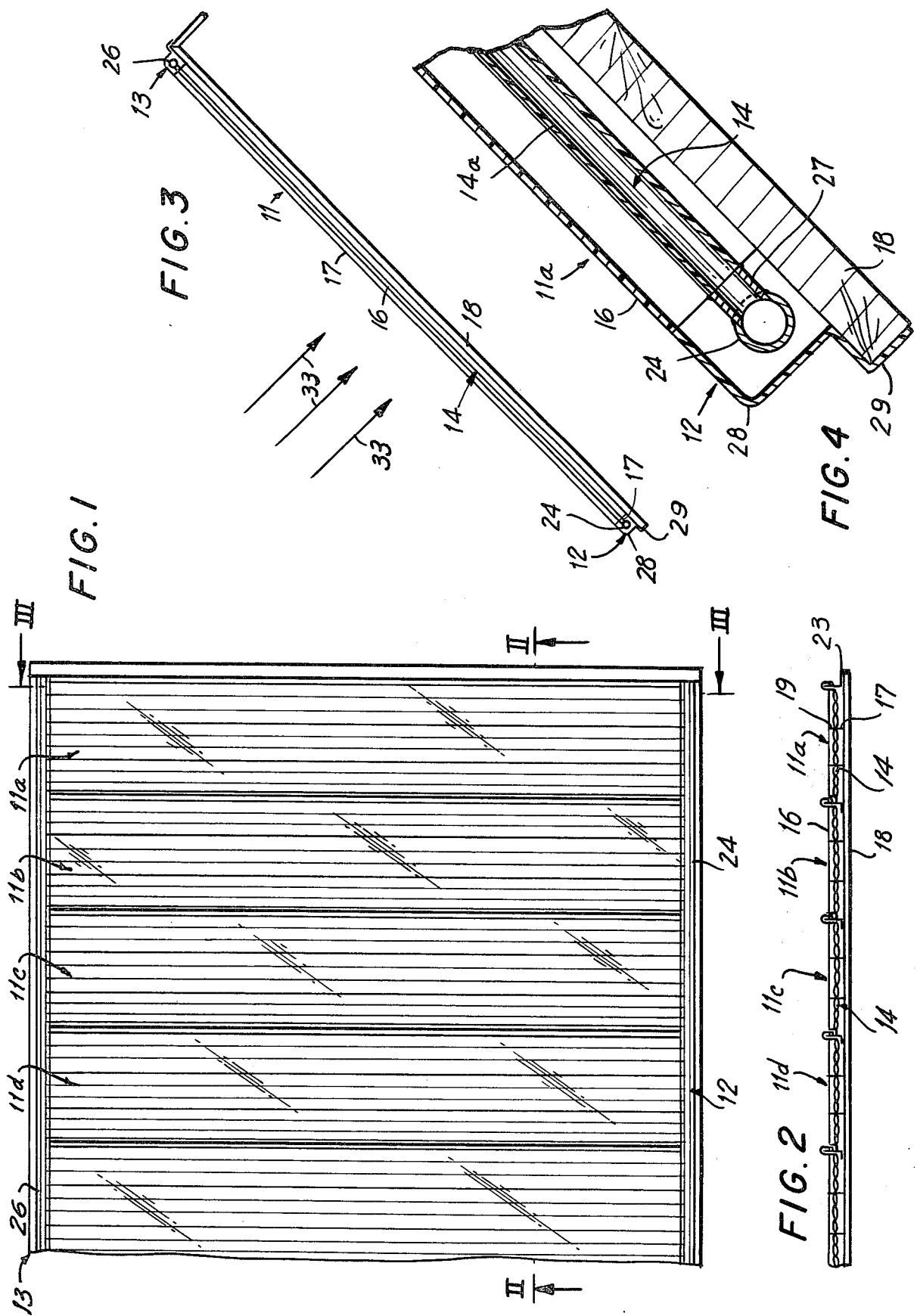

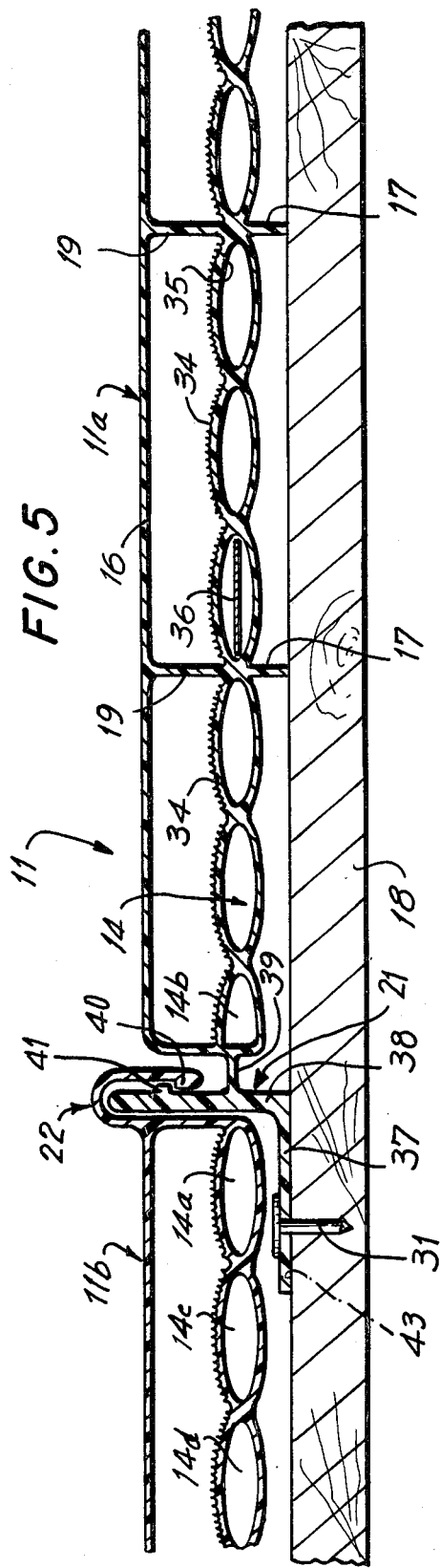
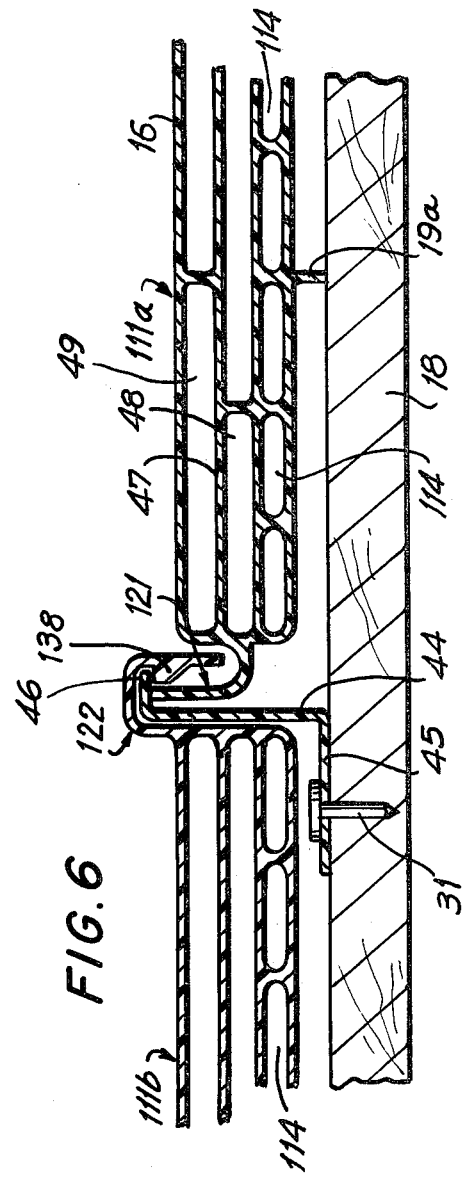

SOLAR PANEL

BACKGROUND OF THE INVENTION

1. Field of the Invention

This invention relates to the field of panels to absorb solar radiation in liquid flowing in passageways constructed in the panels.

2. The Prior Art

Typical solar panels consist of an assembly of a shallow pan, or collector plate, with water passages attached to the plate or formed with it as part of an extruded structure. A sheet of transparent material covers the collector plate and is sealed to the edges of it so that the water passages are insulated from the atmosphere but can receive the solar radiation through the transparent material without being air cooled. Some panels have two such transparent sheets.

The solar panels are typically placed on a completed roof and rest on the roofing material that furnishes the required weatherproofing.

Such panels are made up of separate components of different materials that must be hand assembled to form a finished panel. Furthermore, they are not intended to take the place of the customary roofing material and so they constitute an entirely extra expense in the structure with which they are to be used. If one panel must be serviced, it is difficult to separate it from the other panels and to replace it after service has been performed on it or to replace it with a new panel.

OBJECTS AND SUMMARY OF THE INVENTION

It is one of the objects of the present invention to provide an improved solar panel substantially less expensive and more convenient to use than existing panels.

It is another object of the invention to provide extruded panels formed as a unit.

It is a further object to provide panels that are able to keep rain from reaching the roof and which therefore can take the place of part of the ordinary roofing materials.

It is a still further object of the invention to provide panels that can be easily installed and removed in case service needs to be performed on them.

Further objects will be apparent from the following specification and the accompanying drawings.

In accordance with the present invention extruded panels are formed of a suitable plastic material, such as Plexiglas, or a polycarbonate material, such as Lexan. It is possible to extrude such material to form panels several feet wide and as long as may be desired. The panels include several passages for liquid to be heated by solar radiation. These passages are formed side by side and joined one to the other in the extrusion process. The cover is also formed in the same extrusion process and is spaced from the passages and attached to them along the outermost edges of the outer passages. The passages carry the liquid to be heated by solar radiation and the cover encloses a dead-air insulating space over the passages.

The opposite edges of the structure include flanges that either interlock directly with flanges of the next adjacent panels in an overlapping manner to form a waterproof structure or interlock with a flanged member previously nailed to the roof on which the panels are placed. If the panels are to interlock directly with each other, one edge of each panel may include a nailing flange, and in that case, it is desirable that the flange part of the panel have a sufficiently flexible section to allow adjacent panels to be disengaged in case it is necessary to service or replace one of the panels. At least one supporting rib extends downwardly from the liquid passages to the roof to support the panel from the roof and with a dead-air space between the lower surface of the passages and the roof. This additional dead-air space provides further insulation of the roof and prevents any direct loss of heat from the passages to the roof material.

In case double layers of insulation are required over the passages to reduce still further any heat loss to the atmosphere from the radiantly heated liquid in the passages, an intermediate cover between the passages and the outer cover may be extruded at the same time as the outer cover. Furthermore, the covers, which should be as transparent as possible, may be extruded simultaneously with passages that have an opaque material included in the plastic material during the extrusion process so that the passages will absorb as much of the radiation that reaches them as possible. As an alternative, the passages can have at least their upper surfaces blackened, or strips of opaque material can be inserted into them after they have been extruded to absorb radiation efficiently and transfer it as heat to liquid in the passages without having the heat re-radiated or reflected. A still further modification is to roughen the upper surface of the passages to absorb radiation still more efficiently.

BRIEF DESCRIPTION OF THE DRAWINGS

FIG. 1 is a plan view of a fragment of a roof covered by solar panels formed according to the present invention.

FIG. 2 is a cross-sectional view along the line II—II in FIG. 1.

FIG. 3 is a cross-sectional view along the line III—III of FIG. 1.

FIG. 4 is an enlarged part of the structure shown in FIG. 3.

FIG. 5 is an enlarged cross-sectional view of one section of the structure shown in FIG. 2.

FIG. 6 is an enlarged cross-sectional view of a modified embodiment of the invention.

DETAILED DESCRIPTION OF THE INVENTION

The roof in FIG. 1 is covered by a plurality of solar panels 11a–11d connected together at their bottom edges by a manifold 12 and at their top edge by another manifold 13. Each of the panels is extruded as a single piece of plastic material, such as Plexiglas, or a polycarbonate material, such as Lexan. Furthermore, each panel has a plurality of water passages in it arranged in a manner to be described later and the panels are attached to the roof by means of structural elements which will also be described later.

FIG. 2 is a cross-sectional view of the panels 11a–11d. Each panel has a plurality of water passages 14 covered by a transparent sheet 16. The water passages 14 are arranged in a plane and are extruded so that there is a common wall between a pair of passages. Also included in the extrusion are support ribs 17 that support the passages 14 from the roof sheathing 18 and other ribs 19 that help support the transparent sheet 16 above the passages 14. Each of the panels 11 has integrally formed flanges 21 and 22 along opposite edges. These flanges are so shaped that they interlock with each other to form a waterproof cover for as much of the roof as is covered by the panels. The panels can be made in a standard architectural modular size so that they can cover the entire roof. Special edge strips 23 can extend over the edges of the sheathing 18 to complete the coverage. This eliminates the necessity for providing the usual roofing material to make the roof waterproof and to prevent the wooden sheathing 18 from being exposed to moisture and sunlight.

FIG. 3 shows a cross-section of the panel 11a and the roof sheathing 18 on which this panel and the other panels rest. The manifold 12 is shown as comprising a pipe 24 running along the lower edges of all of the panels and connected to each water passage 14 in the panels. The manifold 13 comprises a similar pipe 26 that runs along the upper edges of the panels and is likewise connected to the water passages 14 in the panels. One of the passages 14a connecting the manifolds 12 and 13 is shown in this cross-sectional view.

FIG. 4 shows the manifold 12 on an enlarged scale. The manifold includes short pipes 27 that extend perpendicularly from the main pipe 24 and are joined watertight, by a suitable adhesive for example, to the passages 14. The manifold 12 is protected and insulated by a cover 28, one edge of which is sealed to the edge of the sheet 16 and the other edge of which forms a protective flange 29 over the edge of the sheathing 18 and is fastened to the sheathing by fasteners 31. The pipe 24 may be attached to the cover 28 by supports 32 spaced apart by the width of a panel 11.

In a complete solar heating system, the water enters the lower manifold 12 and is forced through the short pipes 27 into each of the passages 14. The water is then forced up the passages 14 to the upper manifold 13. The manifold 13 has short pipes connecting its main pipe 26 to each of the passages 14 in a manner similar to the manifold 12. The main pipe 26 is connected to a pipe (not shown) that carries the solar heated water from the panels 11 into the building. The angle of the panels 11 relative to a horizontal plane is preferably such that sunlight, which is indicated by the arrows 33, strikes the panels 11 substantially perpendicularly at midday during the time just after the winter solstice.

FIG. 5 shows sections of two of the panels 11a and 11b in enlarged detail. As shown in FIG. 5 the water passages 14 are of generally elliptical cross-section although that shape is not essential to the invention. In fact, one of the passages 14b is shown as consisting of one-half of an ellipse. The passages 14 are all arranged to be substantially co-planar and are, in effect, separated into small groups by the ribs 17 that rest on the roof sheathing 18. The space above the passages 14 is enclosed by the transparent sheet 16 that is integrally extruded so that it connects with the endmost passage 14b of the right hand panel 11a and the endmost passage 14a of the left hand panel 11b. The ribs 17 are directly over the ribs 19 and help space the transparent sheet 16 from the passages 17. The ribs 17 may not be necessary if the panels 11 are not too wide. This is especially true if the extrusion material is Lexan, which is quite strong and would make the sheet 16 self-supporting.

Water flows through the passages 14 in parallel, and so the passages need not be of the same size. In order to absorb heat from the solar radiation, the upper surface 35 of each of the passages 14 may be blackened, preferably in such a way as to avoid reflecting the solar radiation. Such roughening may be in the form of a finely grooved surface 34. The extruded panels 11 are open at each end during manufacture, and paint may simply be poured through the space between the water passages 14 and the transparent sheet 16. Care must be taken not to get paint on the sheet 16 and thus render it opaque.

The lower surface of the passages 14 could also be painted to absorb heat, although the lower surfaces of the passages 14 could, if desired, be made reflective to prevent radiation loss to the sheathing 18.

Alternatively to painting any surfaces, coloring material could be added during the extrusion process and restricted so that it only emerged from part of the extrusion die that forms the passages 14.

A still further alternative is to place a strip 36 of black, heat absorbant material in each of the passages 14, if the extrusion material is transparent.

The flange 21 as shown in FIG. 5 is a complex structure with a nailing section 37 and a vertical section 38. The nailing section 37 and the section 38 are shown as being substantially perpendicular to each other although it is not necessary that they have this angular relationship. They are joined to the main part of the panel 11 by a relatively thin web 39.

The flange 22 extends up over the flange section 38, and a ledge 40 on the inwardly facing surface of the flange 22 hooks under a projecting ledge 41 on the section 38 of the flange 21. The ledges 40 and 41 interlock with each other when adjacent panels 11 are installed properly, and so the right hand edge of each of the panels 11, as illustrated by the panel 11b, is held down by engagement with the flange 21 at the left hand edge of the next adjacent panel 11a. In installing the panels 11, the panel 11a farthest to the right is installed first by driving nails 41 through the nailing section 37. Then the next panel 11b to the left is placed so that its ledge 40 hooks under the ledge 41 of the previously installed panel 11a. Nails are then driven through the nailing flange (not shown) of the second panel 11b. Installation progresses in this manner for the rest of the panels 11. Of course, it is not necessary that the flange 21 be on the left hand side of each panel 11 and that the flange 22 be on the right hand side. It would be just as satisfactory to place the flange 21 on on the right and the flange 22 on the left.

When all of the panels 11 have been installed, the sheathing material that forms the roof 14 will be completely covered and isolated from the weather. The webs 39 are low enough to form gutters for the panels 11 to which they are attached, and the substantial overlapping of the flange 22 with respect to the flange section 38 prevents rain from being driven up under the flange 22 to enter the space under the passage 14a and the other passages 14c and 14d to the left of the passage 14a. If desired, caulking material may be installed to seal any passageways that might be found by excessive moisture.

If it is necessary to remove the panel 11a, it may be possible to do so by forcing the overlapping section of the flange 22 of the panel 11b far enough away from the flange section 38 of the panel 11a so that the ledges 40 and 41 will no longer be interlocked. Then the panel 11b could be pivoted upwardly about its own nailing section corresponding to the section 37 if its web corresponding to the web 39 were sufficiently flexible. This would permit the nails 31 to be removed from the nailing flange of the panel 11a that required service. Once the nails were removed, that panel could then be removed and repaired or replaced by another panel. Alternatively, the nails 31 could be driven into slots 43 in the nailing section 37 to permit the panel 11a to be slid out without removing the nails.

FIG. 6 shows another embodiment that permits easier disassembly of the panels to remove one of them if it becomes necessary to do so. In FIG. 6 the panels are identified as the panels 111a and 111b. Panel 111a has a flange 121 that is formed to extend upwardly from the region at which it joins the panel 111a. The panel 111b has a flange 122 that is relatively similar to the flange 22 in FIG. 5 except that the ledge 138 of the flange 122 is relatively high up.

A separate holding piece 44, which may be extruded or formed of metal as a double angled strip, has a nailing flange 45 and an engaging flange 46. Both the upper edge of the flange 121 and the upper surface of the ledge 138 hook under and preferably press against the engaging flange to hold the respective panels 111a and 111b in place.

The structure in FIG. 6 still provides protection of the sheathing 18 against weather. In addition, it facilitates removal of a single panel. All that is required is to disengage the ledge 138 from the engaging flange 46. Then the panel 111a that is to be serviced can simply be pivoted about the rib 19a closest to the flange 121, and the panel 111a will be free to be removed without affecting any other panel.

The passages 114 in FIG. 6 are somewhat flatter than the passages 14 in FIG. 5. The structure in FIG. 6 also differs from that in FIG. 5 by including an additional transparent sheet 47 to divide the space between the passages 114 and the sheet 16 into parts 48 and 49. This improves isolation of the passages 114 from the outside air and thus tends to allow the water in the passages to reach a higher temperature than the water in the passages 14 in FIG. 5. However, the sheets 16 and 47 cannot be perfectly transparent and so less intense radiation reaches the water in the passages 114. This cancels part of the advantage of the improved insulation.

What is claimed is:

1. A solar radiation absorbing member comprising:
a plurality of substantially coplanar elongated fluid passageways extruded together joined side by side to form an integrally extruded unit comprising longitudinal edges;
a radiation-transmissive cover extending over all of said coplanar passageways and spaced from said passageways on one side thereof and joined to the outermost ones of said passageways adjacent said longitudinal edges to form an air-tight channel with said passageways as one wall section thereof;
supporting rib means extending from said extruded unit parallel to said passageways and in the direction away from said cover to support said extruded unit spaced from a base structure to minimize heat transfer from said extruded unit to said base structure; and
means to hold both of said longitudinal edges in substantially fixed relationship to said base structure.

2. The solar radiation absorbing member of claim 1 comprising a radiation-transmissive panel substantially coextensive with said cover and spaced therefrom between said cover and said passageways to separate said airtight channel into two parallel channels, said passageways and panel and cover being extruded as an integral unit.

3. The solar radiation absorbing member of claim 1 comprising a locking flange extruded with said extruded unit and said cover and comprising said rib means and extending longitudinally along one side of said airtight channel to engage hold-down means to hold said one side of said channel in substantially fixed spaced relationship to said base structure.

4. The solar radiation absorbing member of claim 3 comprising a second flange extruded with said extruded unit and extending longitudinally along the opposite side of said airtight channel from said locking flange, said second flange engaging the locking flange of an immediately adjacent air-tight channel to be held thereby in fixed spaced relationship to said base structure.

5. The solar radiation absorbing member of claim 4 in which said first-named flange comprises an upwardly turned outer edge and said second flange is at a height to extend over said edge of said first-named flange and comprises a downwardly turned edge and locking means integrally formed therewith to overlap and lock with the upwardly turned edge of an adjacent identical radiation absorbing member when two such absorbing members are placed side by side on a flat surface.

6. The solar radiation absorbing member of claim 5 in which said upwardly turned edge comprises a ledge facing said airtight channel from which said first-named flange extends and said second flange comprises a ledge extending therefrom toward said airtight channel from which said second flange extends, the relative locations of said ledges being such that when two of said radiation absorbing members are placed side by side with said second flange of one of said members extending over said first-named flange of the other of said members the respective ledges are in interlocking relationship with each other.

7. The solar radiation absorbing member of claim 5 in which said first-named flange comprises a nailing section that extends in substantially the opposite direction from said extruded unit.

8. The solar radiation absorbing member of claim 7 in which said nailing section comprises a plurality of slots substantially perpendicular to the longitudinal direction of said elongated passageways to permit said member to be slid out from under nails through said slots.

9. The solar radiation absorbing member of claim 7 in which said nailing section and said upwardly turned edge are connected to said airtight channel by a web which, together with said upwardly turned edge, comprises a gutter.

10. The solar radiation absorbing member of claim 5 comprising, in addition, a holding piece separate from said airtight channel and comprises a nailing flange and an engaging flange, said upwardly turned edge of said first-named flange fitting under said engaging flange to be held down thereby, said radiation absorbing member comprising pivot means to allow said radiation absorbing member to be pivoted in a direction to separate said first-named flange from said engaging flange, said second flange having a height and width sufficient to extend over said holding piece and said engaging flange, the edge of said second flange extending substantially below the level of said holding edge.

11. The radiation absorbing member of claim 10 in which said second flange has a locking ledge facing the airtight channel from which said second flange extends whereby two of said radiation members arranged side by side on a flat surface on opposite sides of one of said holding pieces have the respective first-named flange of one of said members held down by said engaging flange and said ledge of the other of said member also engaged and held down by said engaging flange.

12. The solar radiation absorbing member of claim 10 in which said rib means comprises a rib extruded as part of said extruded unit and extending from the surface thereof facing away from said cover and spaced from said upwardly turned edge toward said second flange to define a pivot axis about which said channel can be pivoted to disengage said upwardly turned edge from said engaging flange.

13. The solar radiation absorbing member of claim 1 in which said supporting rib means comprises a plurality of spaced ribs extruded simultaneously with said extruded unit and extending from the surface of said extruded unit facing away from said cover to provide plural load-bearing means of limited cross-sectional area between said extruded unit and said base structure.

* * * * *